H. J. HAGGE.
ANIMAL TRAP.
APPLICATION FILED OCT. 8, 1910.
986,460.
Patented Mar. 14, 1911.
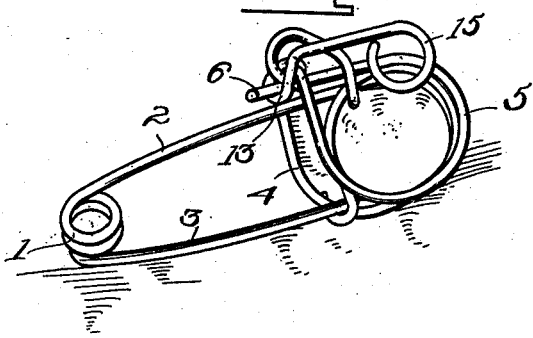
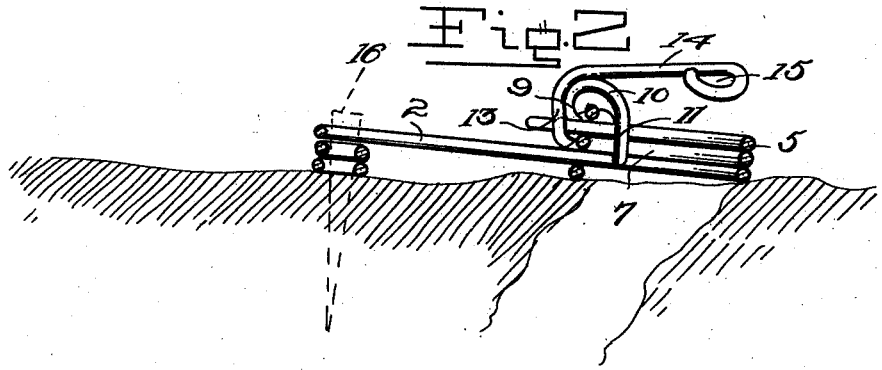
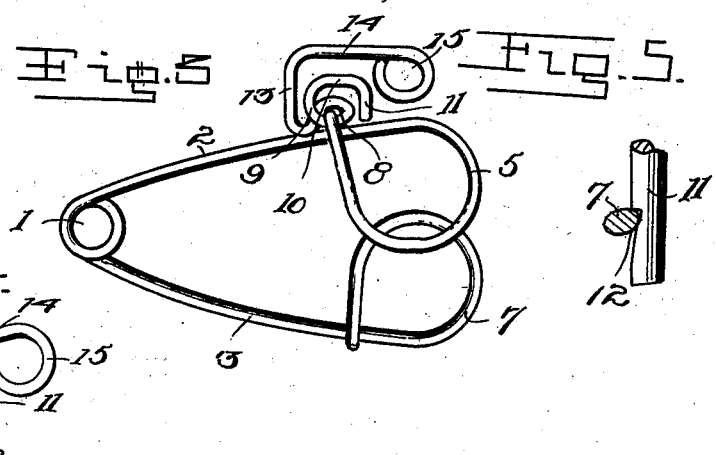
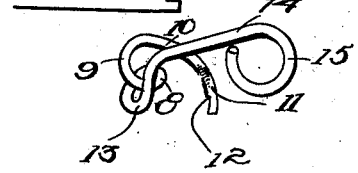
Witnesses
Howard F. Costello.
Ross J. Woodward.
Inventor
Hans J. Hagge
By E. E. Vrooman,
his Attorney.

UNITED STATES PATENT OFFICE.

HANS J. HAGGE, OF OGDEN, IOWA.

ANIMAL-TRAP.

986,460.  Specification of Letters Patent.  Patented Mar. 14, 1911.

Application filed October 8, 1910. Serial No. 586,110.

*To all whom it may concern:*

Be it known that I, HANS J. HAGGE, a citizen of the United States, residing at Ogden, in the county of Boone and State of Iowa, have invented certain new and useful Improvements in Animal-Traps, of which the following is a specification, reference being had therein to the accompanying drawing.

This invention relates to an animal trap. The principal object of the same is to produce a trap which can be placed at the mouth of the burrow, so that the animal will be caught when coming out.

This invention is illustrated in the accompanying drawings, wherein:

Figure 1 is the perspective view of the improved trap. Fig. 2 is the longitudinal sectional view through the trap, showing how the trap would appear when set. Fig. 3 is a top plan view of the trap as it would appear when released from the trigger. Fig. 4 is an enlarged view of the trigger. Fig. 5 is the fragmentary view of the end of the trigger showing how the trigger engages the intermediate jaw.

This trap is formed from a length of spring metal which is bent intermediate its length to form a spiral spring 1, having arms 2 and 3 extending from its two outer convolutions. Arm 2 is bent near the outer end to form a circular jaw 4. The remaining portion of the strip is bent around arm 2 and retracted over the jaw 4 to form a second jaw 5 which is spaced from jaw 4. The end 6 of the strip of metal is passed through the space between the jaw and the arm 2 for a purpose to be brought out hereinafter. The arm 3 is bent near its end to form a circular jaw 7 which is of the same size as the jaws 4 and 5 and is so positioned as to pass between them when the trap is set. The trigger is formed from a length of spring metal which is bent, intermediate its length, to form an eye 8 having two arms extending therefrom. The trigger is secured to the trap by having the portion of the arm 2 connecting the jaws 4 and 5 passed through the eye 8 as shown in Fig. 3. One of the arms extending from eye 8 is curved as shown at 9 and the remaining portion of the arm is curved over eye 8 as shown at 10, and bent downwardly to approximately the same level as shown at 11. The portion 11 is provided near its ends with the tooth 12, for a purpose brought out hereinafter. The other arm leading from the eye 8 is curved to one side of the portion 9 and bent upwardly as shown at 13. The remaining portion of the arm is bent at right angles, and the portion 13 is brought over and beyond portion 10 as shown, at 14, and terminated in circular abutment 15.

In order to set the trap the trigger is raised to a vertical position and turned so that the portion 13 is passed between the end 6 and the arm 2. In this position the end 11 will extend down through the jaw 5, and the abutment 15 will be above the jaw 5. Jaw 7 is now brought between the jaws 4 and 5 and is engaged by notch 12 as clearly shown in Fig. 5. When set the trap would appear as shown in Figs. 1 and 2.

When the trap is set it is placed upon the ground with the jaws over the mouth of the burrow. The trap is secured into place by any suitable means, such for instance as by means of a peg, driven through spring 1. When the animal attempts to leave the burrow its head will strike the abutment 15 which will release the jaws and permit them to spring open catching the animal around the neck and choking it to death.

Having thus described my invention, what I claim is:

1. A trap of the character described, comprising a spiral spring, a pair of arms extending from said springs, one of said arms being bent intermediate its length to form a circular jaw the remaining portion of said arm being bent around the major portion of said arm and bent to form a second jaw spaced from said first mentioned jaw, the end of said arm passing between second mentioned jaw and the major portion of said arm, a trigger secured to the portion of said arm connecting said jaws and passing between the end of said arm and the major portion of said arm, and the other of said arms provided at its outer end with the circular jaw adapted to pass between said first mentioned jaw and retained in place by said trigger.

2. A trap of the character described, comprising a pair of spring arms and a pair of spaced apart jaws formed at the end of one of said arms, a single jaw formed at the end of the other arm and adapted to pass between said first mentioned jaws, a trigger for said trap, said trigger formed from a single length of metal bent to form a securing eye having two arms extending therefrom, one of said arms being curved upwardly and over said first mentioned arm and the remaining portion of said arm bent downwardly over said jaw and being provided near one of its ends with a notch adapted to engage said second mentioned jaw to retain the same in place, and the other of said trigger arms being curved between one of said trap jaws and the end of said arm and the remaining portion of said trigger arm bent upward and over said first mentioned trigger arm and terminating in an abutment spaced above said jaws.

In testimony whereof I hereunto affix my signature in presence of two witnesses.

HANS J. HAGGE.

Witnesses:
JOHN SPRECHER,
JOHN C. HAGGE.

Copies of this patent may be obtained for five cents each, by addressing the "Commissioner of Patents, Washington, D. C."